July 7, 1959   G. F. MONTGOMERY   2,894,206
TRANSISTOR BETA TESTER
Filed March 18, 1958

$T_1$ -200-10,000 ohms (N = 7), UTC TYPE SSO3 or EQUIVALENT
$T_2$ -500-3.2 ohms, ARGONNE TYPE AR-119 or EQUIVALENT INVENTOR
George Franklin Montgomery
BY Arthur Vinograd
ATTORNEY

United States Patent Office 2,894,206
Patented July 7, 1959

2,894,206

TRANSISTOR BETA TESTER

George Franklin Montgomery, Washington, D.C., assignor to the United States of America as represented by the Secretary of Commerce Application March 18, 1958, Serial No. 722,362

3 Claims. (Cl. 324—158)

The present invention relates to measuring instruments and particularly contemplates an instrument for testing semiconductors such as junction transistors.

In accordance with the principles of the present invention, an audio-frequency oscillator circuit is provided with a calibrated feedback control. An oscillation indicator is included to permit measurement of the short-circuit, grounded-emitter current amplifications or gain ($\beta$) of the junction transistor at audio frequency. The present invention accordingly provides a convenient means for quickly determining the usability of a transistor.

In operation, the transistor under test is plugged into the circuit of the present invention to form an oscillator and a suitably calibrated potentiometer is adjusted to the point where audio oscillation just begins as evidenced by the oscillation indicator which may be in the form of a conventional loudspeaker. The current gain, $\beta$, is then read directly from the calibrated potentiometer.

It is accordingly an immediate object of the present invention to provide an instrument for quickly determining the usability of p-n-p and n-p-n type transistors by measuring the short-circuit, grounded-emitter current gain.

Another object of this invention is to provide an instrument which will effectively test transistors by the simple manipulation of a calibrated dial.

Still another object of this invention is to provide a measuring instrument for quickly determining the "$\beta$" or short-circuit, grounded-emitter current gain of both p-n-p and n-p-n type transistors.

Other uses and advantages of the invention will become apparent upon reference to the specification and drawings.

The instrument of the present invention is designed to measure the common-emitter, short-circuit current amplification or gain of both n-p-n and p-n-p junction transistors at low audio frequencies. Such amplification or gain characteristics will be referred to throughout the specification as the $\beta$ of the transistor.

Figure 1:
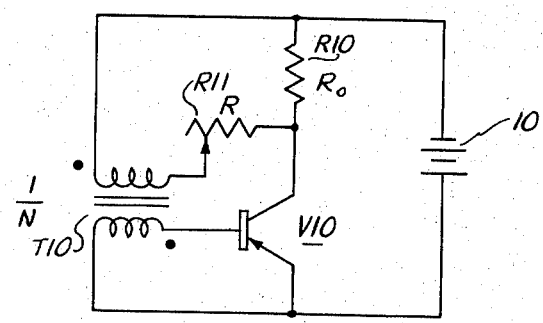
Fig. 1 is a circuit diagram showing the principles involved.

Fig. 1 illustrates the basic principles involved in connection with the present invention. The transistor to be tested V10 is connected in a circuit as indicated in which the base is connected to one winding of a transformer T10. The emitter electrode is connected to the opposite terminal of the transformer winding and to one terminal of a potential source 10. The collector electrode is connected to a resistor R10 having a value $R_0$ and through an adjustable resistor R11 of a value R to the secondary winding of transformer T10. As indicated, the collector electrode is connected to a power source through transformer T10 and resistor R10.

Assuming initially that the value $R_0$ of R10 is small compared with the transistor output impedance, and that the value R of R11 is large compared to $1/N^2$ times the transistor input impedance, where N represents the turns ratio of transformer T10, then for the value R of R11 at which oscillation just begins, the base current of the transistor can be expressed as $$I_b = \frac{-I_c R_0}{N(R_0 + R)} \quad (1)$$

where $I_c$ is the collector current. The current gain $\beta$ therefore is $$\beta = \frac{-I_c}{I_b} = N\left(1 + \frac{R}{R_0}\right) \quad (2)$$

Because of the above relation it will be apparent that variable resistor R11 can readily be calibrated to read the values of $\beta$ directly. Moreover in the range where $R/R_0 \gg 1$ the calibration will be linear if a linear potentiometer is employed for R11.

The circuit of the present invention is arranged so that the transistor under test will adjust itself to a specified D.C. operating point, in order to reduce the number of controls to a minimum. The complete circuit of the test instrument comprising the present invention is shown in Fig. 2.

The basic circuit described in connection with Fig. 1 is identified by like reference numerals in Fig. 2. The values of the resistances indicated in Fig. 2 have been chosen to fix the operating point at about 5 volts collector potential and 1 milliampere collector current. For any transistor having a $\beta$ within the measuring range of the instrument, such D.C. values will be approximated closely.

Figure 2:
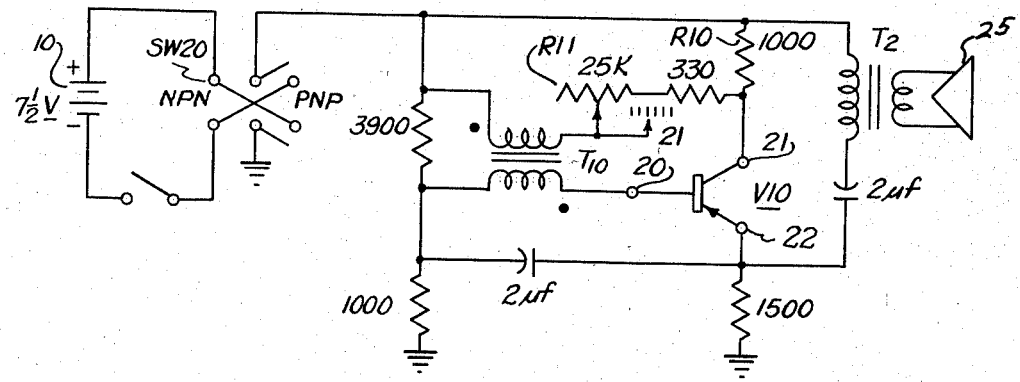
Fig. 2 is a circuit schematic detailing the actual construction of a preferred embodiment of this invention.

Referring more specifically to Fig. 2, suitable jacks or connecting terminals 20, 21, and 22 are provided to permit rapid connection of the electrodes of the particular transistor V10 under test. The voltage source 10 is connected to the test circuit through a reversing switch SW20 to provide the proper polarity for either an n-p-n or p-n-p type of transistor. The connections between the transistor V10 under test and the transformer T10 as shown provide an oscillator in which the feedback current passes through the circuit including adjusted resistor R11. The frequency at which oscillation begins will depend upon the characteristics of the transformer T10 and the phase shift of $\beta$. The current ratio of the transformer employed in the disclosed embodiment has a broad maximum centered at about one or two kilocycles per second, and if the phase shift of the transistor is sufficiently small, oscillation will begin at a frequency near such maximum. For transistors having a larger phase shift, the frequency of oscillation will be reduced. The amplitude of $\beta$ required to produce oscillation for a given setting of dial 21, however, is not a particularly sensitive function of frequency, so that measurements accurate to within a few percent can be expected. The values of the components employed are specified in Fig. 2, and sufficient details of the circuit components are listed therein to enable the instrument of this invention to be readily reproduced. The means for indicating oscillations comprises a loudspeaker 25 connected to the test circuit through an impedance such as transformer T2.

Calibration

For simple comparative measurements, the dial 21 can be roughly calibrated in accordance with the parameters defined by Equation 2, knowing the values of N and R. To provide a more accurate calibration, a procedure exemplified by the circuit diagram of Fig. 3 is employed.

Figure 3:
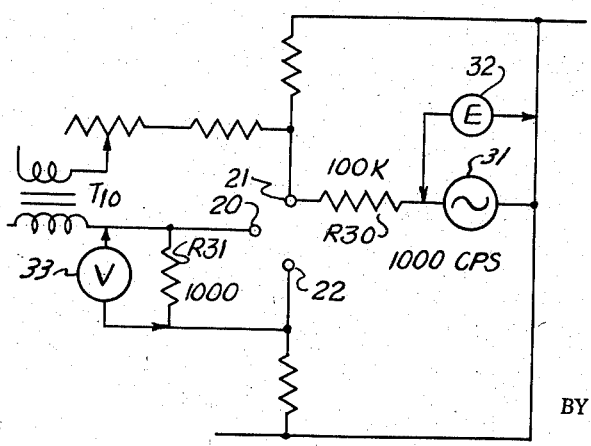
Fig. 3 is a circuit diagram illustrating the method of calibrating the test instrument comprising the present invention.

Fig. 3 shows the test portion of the circuit of Fig. 2, A resistor R30 and signal source 31 is connected in series with collector electrode test terminal 21, and a voltmeter 32 is connected across the signal source. The signal source 31 should have an output of from 10 to 50 volts at 1000 c.p.s. A 1000-ohm resistor R31 is connected across the base and emitter electrode test terminals 20 and 22 and the voltage across such resistor is measured with a sensitive voltmeter 33. Then:

$$\beta = \frac{E/10^5}{V/10^3} = \frac{E}{100\ V} \tag{3}$$

and the dial can then be calibrated from a series of measurements of E and V. Specifically, with the component values indicated in Fig. 2, the measurable range of $\beta$ is from 10 to 170.

In operation, the transistor to be tested is connected to the jacks 20, 21, and 22. Reversing switch SW20 is then positioned so that the polarity of source 10 will correspond to the type of transistor under test. The dial indicated as 21 in Fig. 2 is then carefully turned, adjusting the value of R11 until oscillation just begins as manifested by loudspeaker 25. When oscillation begins, the conditions defined by Equation 2 hold, and the value of $\beta$ will be indicated by the setting of dial 21.

It will be apparent that the embodiments shown are only exemplary and that various modifications can be made in construction and arrangement within the scope of invention as defined in the appended claims.

What is claimed is:

1. An instrument for rapidly determining the usability of n-p-n and p-n-p junction transistors by measuring the short-circuit, grounded-emitter current amplification thereof comprising an oscillator including a transformer having at least two windings, means for incorporating the transistor under test into said oscillator including means for connecting the base and the emitter electrodes respectively of the test transistor to opposite terminals of one of said transformer windings, feedback means including an adjustable resistor connecting the collector electrode of said test transistor to the other of said transformer windings, a source of D.C. power, means connecting the electrodes of said test transistor to said D.C. source and oscillation indicating means connected across the collector and emitter electrodes of said test transistor.

2. The invention of claim 1 in which said adjustable resistor is provided with a scale calibrated in accordance with the short-circuit, grounded-emitter current amplification factor of a transistor.

3. The invention of claim 2 including a polarity reversing switch means for selectively connecting said D.C. power source to said transistor electrodes.

References Cited in the file of this patent

"Junction Transistor Checker," Radio Electronics, August 1954, pages 30–32.

"A Transistor Current Gain Test Set," Radio and Television News, March 1957, pages 54–55.

"Transistor Beta Tester," Electronics, May 1957, pages 198–199.

"A Simple Transistor Beta Tester," Electrical Engineering, August 1957, pages 759–760.